April 11, 1967     B. G. GOODWIN ETAL     3,313,946
SMOKE, FLAME, CRITICAL TEMPERATURE AND RATE
OF TEMPERATURE RISE DETECTOR
Original Filed Nov. 30, 1962                     2 Sheets–Sheet 1
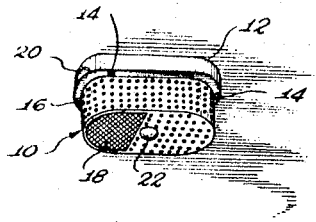
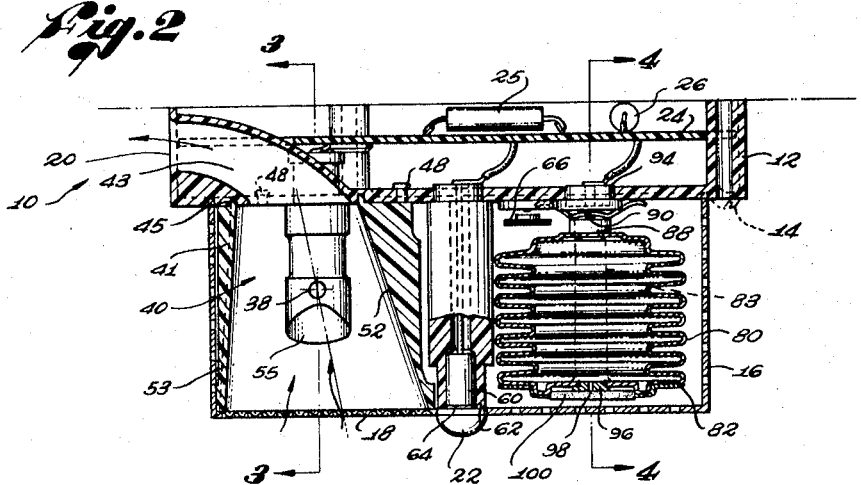
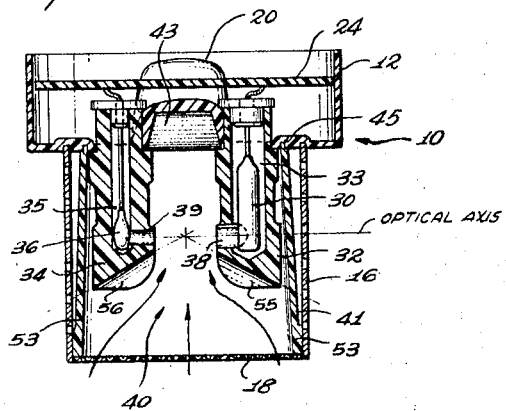
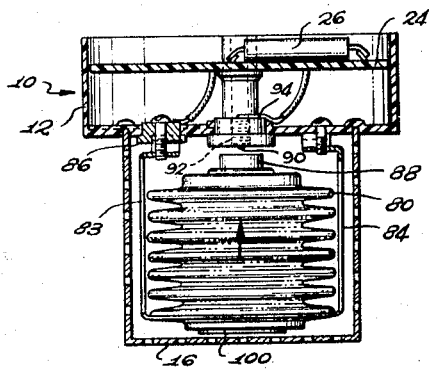
INVENTORS
BENTON G. GOODWIN
WALTER L. CRUMPACKER
BY Zulwider, Patton, Rieber,
Lee and Utecht
Attorneys April 11, 1967 B. G. GOODWIN ETAL 3,313,946
SMOKE, FLAME, CRITICAL TEMPERATURE AND RATE
OF TEMPERATURE RISE DETECTOR
Original Filed Nov. 30, 1962 2 Sheets-Sheet 2
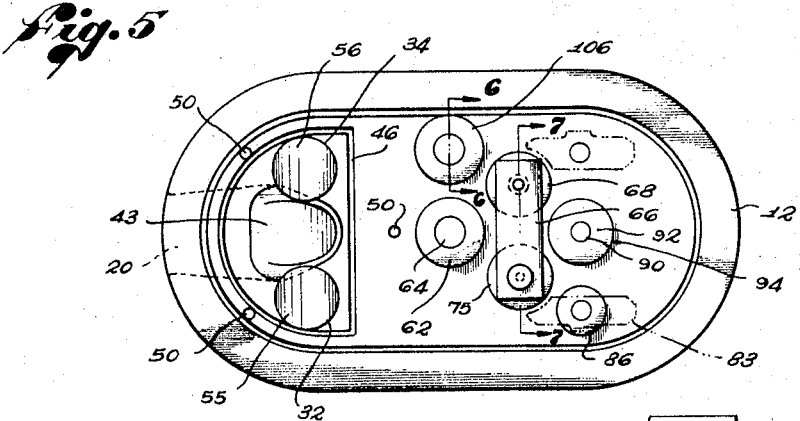
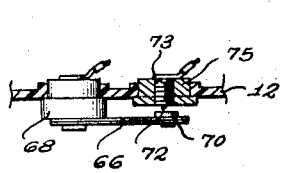
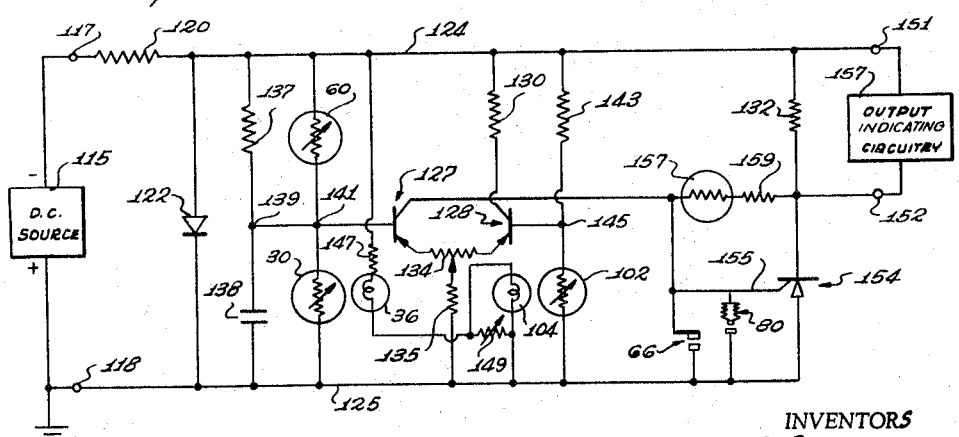
INVENTORS
BENTON G. GOODWIN
WALTER L. CRUMPACKER
BY Fulwider, Patton, Rieber,
Lee and Utecht.
Attorneys United States Patent Office 3,313,946
Patented Apr. 11, 1967

3,313,946
SMOKE, FLAME, CRITICAL TEMPERATURE AND RATE OF TEMPERATURE RISE DETECTOR
Benton G. Goodwin, 19107 Ruddock St., Covina, Calif. 91722, and Walter L. Crumpacker, Sylmar, Calif.; said Crumpacker assignor to said Goodwin
Original application Nov. 30, 1962, Ser. No. 241,199, now Patent No. 3,255,441, dated June 7, 1966. Divided and this application Sept. 1, 1965, Ser. No. 493,302
2 Claims. (Cl. 250—239)

This application is a division of applicants' copending application, Serial No. 241,199, filed November 30, 1962, now U.S. Patent No. 3,255,441.

This invention relates generally to alarm signalling systems, and more particularly to a system for detecting smoke, flame, temperature in excess of a critical level and excessive rate of rise of temperature, and which is capable of producing output electrical signals in response to any one or more of these abnormal conditions in an environment under the surveillance of the detection system.

A wide variety of photosensitive and thermally responsive devices have heretofore been provided for the detection of fire. However, although such devices have generally served their purpose, no single device has proven entirely satisfactory for all conditions of service. Primary among the deficiencies of fire detection and warning systems generally in use have been high cost, bulkiness, activation by conditions other than those indicative of fire, slow or erratic response, and the inability to monitor a sufficient number of fire indicative parameters to render the system useful in detecting fires of widely divergent character, e.g., slow smoldering fires as opposed to rapidly burning fires and explosions. Moreover, when smoke sensors have been used to indicate the presence of a fire, considerable difficulty has been encountered in getting the smoke to enter the region adjacent the sensing unit.

Accordingly it is an object of the present invention to provide a new and improved fire detection and warning system which overcomes the above and other disadvantages of the prior art.

Another object is to provide a fire detection and warning system capable of adequate response for fires of widely divergent origin and character.

A further object of the invention is the provision of a fire detection and warning system capable of simultaneously monitoring the presence of smoke, flame, temperature above a critical level, and execessive rate of rise of temperature, and producing a single output electrical signal in response to any one or more of these abnormal conditions.

Still another object is to provide a new and improved fire detection and warning device capable of functioning with existing telephone systems and monitoring consoles without requiring modification of such existing equipment.

Yet another object of the present invention is the provision of a new and improved fire detection and warning device which, in the presence of smoke, is capable of more effectively conveying the smoke through the smoke sensing region of the detecting device.

A still further object is to provide a new and improved fire detection and warning device which is extremely stable in operation and less prone to false activation by non-fire-indicative conditions.

Still another object of this invention is the provision of an improved fire detection and warning device which is compact in size, rugged, relatively inexpensive to manufacture, and is extremely reliable in operation.

The above and other objects and advantages of this invention will be better understood by reference to the following detailed description, when considered in connection with the accompanying drawings of an illustrative embodiment thereof, and wherein:

FIGURE 1 is a perspective view of a typical installation of the fire detection and warning device of the present invention;

FIGURE 2 is a longitudinal section, in elevation, through the center of the device shown in FIGURE 1, and illustrates the general internal arrangement of the various sensing units and circuit elements;

FIGURE 3 is a sectional view, taken along the line 3—3 of FIGURE 2, and illustrates the smoke detection elements;

FIGURE 4 is a sectional view, taken along the line 4—4 of FIGURE 2, and illustrates the sensing unit for detecting excessive rate of rise of temperature;

FIGURE 5 is a bottom plan view of the device of FIGURE 1, with the external cage, smoke chamber cover, and rate of temperature rise sensor removed, and illustrates the structure of the mounting chassis;

FIGURE 6 is a fragmentary sectional view, taken along the line 6—6 of FIGURE 5, and illustrates the ballast arrangement used for temperature stabilization of the smoke detector;

FIGURE 7 is a fragmentary sectional view, taken along the line 7—7 of FIGURE 5, and illustrates the arrangement for detecting temperature above a critical level; and FIGURE 8 is a schematic diagram of an electrical circuit for producing an output electrical signal in response to activation of the various sensing units.

Briefly, and in general terms, the detection and warning device of the present invention involves a novel combination of sensing units for detecting smoke, flame, temperature in excess of a critical level and excessive rate of rise of temperature, all of these sensing units being provided in a single, compact and rugged package which is easily installed at selected sites. Also housed within the detection device are electric circuit means for temperature stabilizing the smoke and flame detectors, and for triggering a warning indication upon the detection of any fire-indicative condition. The detection and warning device of the present invention further embodies flue means for conveying smoke through the device in the vicinity of the smoke sensing unit.

Referring now to the drawings, and particularly to FIGURE 1 thereof, the numeral 10 designates a detection and warning device, in accordance with the present invention, installed upon an appropriate surface, such as the ceiling above the area which it is desired to protect by the detection device. The device 10 comprises an electrically insulating mounting platform or chassis 12 upon which all of the components are mounted, and which also provides the means by which the device may be attached to the ceiling, as by a plurality of attachment screws 14 passing through holes provided in the chassis. Wherever possible, the structural elements of the device 10 are fabricated of plastic materials to reduce weight and production costs.

An outer cage or shield 16, of perforated brass or the like, provides a protective cover for the sensing units of the detection device 10 and is detachably secured to the lower mounting surface of the chassis 12 as seen in FIGURE 1. The perforations in the cage 16 permit air to enter the device 10 so that the temperature monitoring sensors are always subject to the same temperature variations as the environment external of the cage.

The base of the cage 16 is provided with a cutout portion covered by a wire mesh grill 18 providing larger access openings to the interior of the device 10 than is afforded by the perforations in the cage. This grill 18 forms the entrance to a novel flue construction embodied directly within the device 10. Smoke is drawn and guided by this flue through the smoke sensing region of the detection device to an exit opening 20 at one side of the chassis 12. While the grill 18 permits relatively unimpeded smoke entry, the detection device is still protected against entry of other foreign materials, such as large cinders and the like.

The base of the cage 16 also carries a wide angle lens 22 which receives light from the environment under surveillance and directs this light to the flame detector inside the cage. By virtue of the wide angle characteristics of the lens 22, a smaller number of spaced apart devices 10 may be used to monitor a given area for the presence of flame than has heretofore been necessary with flame detectors generally in use.

As will be apparent from FIGURES 2–4, the electrical circuitry used in conjunction with the various sensing units of the detection device 10 may be provided upon a circuit board 24 which is appropriately secured, as by friction fit or the like, on the side of the chassis 12 opposite that upon which the sensing units are mounted. Wherever possible, the electronic circuitry is provided in printed circuit form upon the circuit board 24, the larger electronic components, such as components 25, 26 and the various sensing units, being electrically connected directly to the circuit board as shown.

The structural arrangement of the smoke detection portion of the device 10 is best observed in FIGURES 2, 3 and 5 of the drawings. A photocell 30 of the photoconductive type, i.e., one which changes its impedance in response to variations in light intensity, is supported within the central bore 33 of an opaque, generally cylindrical housing 32 mounted upon the chassis 12. A similar opaque housing 34 is spaced from the housing 32 and is likewise mounted upon the chassis 12. The housing 34 includes a central bore 35 in which is supported a standard light source in the form of a "grain of wheat" lamp 36. Confronting sides of the housings 32, 34 are each provided with a hole 38, 39, respectively. These holes 38 and 39 are in coaxial alignment, so that a beam of light from the lamp 36 is always directed upon the photosensitive surface of the photocell 30. Smoke detection is accomplished when smoke enters the region between the housings 32, 34 and intercepts the optical axis, i.e., the axis of holes 38 and 39, of the smoke detection system to cause attenuation of the light impinging upon the smoke photocell 30. This attenuation of the light reaching the photocell 30 causes a change in the impedance of the photocell, and it is this change in impedance which triggers the output warning signal from the device 10.

As above noted, a severe limitation upon previous smoke detecting devices has been the difficulty in conveying the smoke through the sensing region. In a number of instances, smoke has been known to surround the smoke detection unit, yet fail to enter the detector itself and, hence, detection is delayed until the smoke becomes sufficiently dense that some portion of it will enter the detection unit. The smoke detector of the present invention provides a long-awaited solution to this problem by incorporating a flue construction 40 directly within the device 10, for continually conveying smoke adjacent the device through the smoke sensing region.

As previously indicated, the flue 40 has its entrance at the grill 18 and its exit at the opening 20 in the side of the chassis 12. Intermediate the entrance 18 and exit 20, the flue 40 is defined by a funnel-like cover 41, the region between the housings 32, 34, and a passageway 43 within the chassis 12.

The funnel-like cover 41 is open at both ends and surrounds the housings 32, 34 when the cover is installed upon the chassis 12. The cover 41 is aligned during installation by a peripheral lip 45 at its upper end which seats within a mating groove 46 (see FIGURE 5) in the chassis 12. The cover may be held to the chassis 12 in any appropriate manner, as by a plurality of integral pins 48 (see FIGURE 2) projecting from the cover through holes 50 in the chassis (see FIGURE 5) and which are peened or heat-welded on the opposite side of the chassis mounting surface.

Preferably, only one portion of the internal surface of the funnel-like cover 41 is provided with any substantial taper, since it has been found that provision of substantial taper over the entire surface reduces rather than enhances the continual flow of smoke through the flue 40. Therefore, as best observed in FIGURE 2, the internal surface 52 of the cover 41 is provided with a substantial inward taper from the entrance of the flue 40 to the mounting surface of the chassis 12. However, as shown in FIGURE 3, the remaining interior surface 53 of the cover 41 is tapered only slightly between the entrance of the flue and the chassis.

The position of the cover 41 and taper angle of the surface 52 are selected so that a line drawn through the optical axis of the lamp and smoke photocell system to the center of the entrance to the passageway 43 will be parallel to the tapered surface 52. This arrangement enhances the probability that smoke entering the flue 40 will intercept the optical axis of the smoke detection system.

It has been further discovered that the smoke is more efficiently conveyed through the flue 40 if the lower ends of the housings 32, 34 are scooped at 55 and 56, respectively, the scoop angle being selected so that vertex of the angle defined by the scooped surfaces lies upon the optical axis of the smoke detector, as shown in FIGURE 3.

The entrance to the flue passageway 42 is likewise positioned with respect to the housings 32, 34 so that maximum efficiency of flow of smoke past the optical axis of the smoke detection system will be obtained. To this end, as previously indicated, the center of the entrance to the flue passageway 43 lies on a line parallel to the surface 52 of the cover 41 and intersecting the optical axis of the smoke detection system.

The flue passageway 43 progressively narrows in proceeding from its entrance between the housing 32, 34 to its exit 20 in the side of the chassis 12. This narrowing of the passageway 43 introduces a venturi effect which produces a pressure differential to further aid in drawing smoke through the smoke sensing region.

In a typical situation, the smoke will surround the detection unit 10. Because of the heat, convection currents cause the smoke to rise and enter the smoke sensing region through the grill 18. In passing through the flue 40, however, the smoke is compressed by the progressively narrowing cross section of the flue. Therefore, when this compressed smoke leaves the flue through the exit 20, there is a sudden gas expansion which drops the pressure at the exit 20. This, in turn, provides a pressure differential between the entrance to the flue 40 at 18 and its exit at 20, to continue drawing smoke through the sensing region. Hence, the first wisp of smoke passing through the flue 40 triggers a self-feeding reaction which then continues to draw in additional smoke.

Flame detection is accomplished by a photocell 60 mounted within an opaque, generally cylindrical housing 62 mounted upon the chassis 12. The end of the housing 62 adjacent the photosensitive surface 64 of the photocell 60 is open to receive light gathered by the wide angle lens 22 previously described. A filter, not shown, may also be provided between the lens 22 and the photosensitive surface 64, or the lens 22 may be appropriately dyed, to limit the response of the flame photocell to a selected portion of the infrared spectrum.

Referring now to FIGURES 2 and 7, the sensing means for detecting temperature in excess of a critical level comprises a bimetallic strip 66 supported in cantilevered fashion and adapted to close an electrical circuit when the critical temperature is reached. One end of the strip 66 is secured to a conductive mounting post 68, whereas the opposite end of the strip carries an electrical contact 70 which is normally spaced from the tip 72 of an adjustable contact 73 within the mounting post 75. The contact 73 is in threaded engagement with the post 75, so that the spacing between the contact tip 72 and the contact 70 may be adjusted to vary the critical temperature at which the contacts will close.

The sensing means for detecting excessive rate of rise of temperature is best observed in FIGURES 2, 4 and 5. This phenomenon is detected by an electrically conductive bellows 80 which is supported by a conductive cradle 82 having a pair of legs 83, 84 mounting the cradle and bellows to the chassis 12. The conductive leg 83 is connected to a conductive terminal post 86. An electrical contact 88 extends from the upper end of the bellows 80, as seen in FIGURES 2 and 3, and this contact is normally spaced from the tip 90 of a contact screw 92 within a mounting post 94.

The spacing between the contacts 88 and 90 may be adjusted in the same manner as the spacing between the contacts 70 and 72 in the temperature detection system of FIGURE 7.

The end of the bellows 80 opposite that carrying the contact 88 has a threaded opening adapted to receive a cap 96. The cap 96 is provided with a central bore or orifice 98 which allows movement of air into and out of the bellows 80. The size of this orifice 98 sets a limit upon the rate of escape of air from the bellows. Hence, if the temperature of the environment rises too rapidly, the gas expansion rate within the bellows 80 will exceed the gas escape rate. Consequently, the pressure within the bellows will increase and the bellows will expand to bring the contact 88 into abutment with the tip 90 of the contact 92. Closing of the contacts in this manner completes the electrical circuit between the terminal post 94, through the conductive bellows and leg 83, to the terminal post 86. On the other hand, if the rate of rise of temperature is relatively low, as in the case of normal room temperature variations, the gas escape rate will equal the gas expansion rate and, therefore, there will be no expansion of the bellows 80 to close the contacts.

A filter element 100, of sintered bronze or the like, is also secured to the bellows 80, adjacent the end cap 96, to prevent dirt from entering and possibly clogging the orifice 98.

As observed in FIGURES 5 and 6, an additional photocell 102 and "grain of wheat" lamp 104 are mounted within an opaque, generally cylindrical housing 106, at opposite ends thereof, so that the lamp can direct a continual beam of light upon the photosensitive surface 108 of the photocell. The housing 106 is mounted upon the chassis 12 in essentially the same manner as the housings 32, 34 and 62. The housing 106 is open at both ends to permit installation of the lamp 104 and photocell 102 within the central bore. To eliminate stray light from emanating through the end of the housing 106 adjacent the lamp 104, an opaque cap 110 is installed to provide a light-tight unit.

The additional photocell 102 and light source 104 provide a ballast arrangement to compensate the smoke photocell 30 for impedance variations caused by changes in temperature of the smoke photocell, as opposed to impedance changes due to attenuation of light impinging upon the smoke photocell. Without some form of temperature compensation for the photocell 30, the over-all system would be prone to false triggering by the smoke sensing unit.

Referring now to FIGURE 8, an electrical circuit for utilizing the aforedescribed sensing units and ballast arrangement is shown. A D.-C. power source 115, which typically may consist of a cadmium sulphide battery backed up by a tickler charger unit, is situated at some convenient location external to the detection device 10, and feeds 14 volts D.-C. to the input terminals 117, 118 of the detection device. A resistor 120, typically of 22 ohms, and a 9-volt Zener diode 122 are connected in series across the D.-C. input. A regulated D.-C. voltage of 9 volts thus appears across the diode 122 and supply buses 124, 125 for use by the remaining circuitry. The positive bus 125 is grounded.

The flame photocell 60 is connected in series with the smoke photocell 30 across the D.-C. line between the buses 124, 125. The flame photocell and smoke photocell may be of the CL 604 and CL 403 ASL photoconductive types, both manufactured by the Clairex Corporation. A pair of matched PNP transistors 127, 128, of the GC 248 type, are connected together in a grounded emitter, differential amplifier configuration. This arrangement includes a resistor 130, of 470 ohms, connecting the collector of the transistor 128 to the negative bus 124. A resistor 132, of 680 ohms, is connected to the bus 124 in series with the collector of the transistor 127. The two emitters of the transistors 127, 128 are coupled together through a potentiometer 134, of 200 ohms, the sliding tap of which is connected to the positive bus 125 through a series resistor 135 of 270 ohms. The potentiometer 134 permits adjustment of the emitter bias for each of the transistors 127, 128 to compensate for any slight variation between the characteristics of the two transistors which might effect the differential output of the amplifier.

A resistor 137, of 56 kilohms, is connected in series with a capacitor 138, typically of 100 microfarads, to provide proper bias for the input transistor 127, and the junction 139 between the resistor and capacitor is connected to the base of the input transistor. Similarly, the photocells 60 and 30 are connected in series between the buses 124, 125, and the junction 141 between the photocells is directly conected to the base of the input transistor 127.

The photocells 60 and 30 are essentially variable impedances connected in series across the D.-C. line, and thereby provide a voltage dividing network for controlling the input voltage to the transistor 127. It will be apparent, therefore, that changes in these impedances, as in the photocell 60 upon the detection of flame, or in the photocell 30 upon attenuation of an impinging light beam by smoke, will increase the voltage input to the transistor 127 to trigger an appropriate warning device. This same result is obtained regardless of which photocell 30 or 60 is affected. The impedances of both of these photocells vary inversely as a function of light intensity, and since the flame photocell is adapted to respond to an increase in light intensity, whereas the smoke photocell is adapted to respond to a decrease in light intensity, actuation of either or both photocells always has the same effect of increasing the negative voltage input between the base of the transistor 127 and the grounded bus 125. The capacitor 138, which is also connected between the bus 125 and the base of the transistor 127, smooths out the response of the system by reducing the sensitivity of the input circuit to transients.

Unfortunately, the impedance of each of the photocells 30 and 60 varies not only with the intensity of impinging light, but also varies as a direct function of temperature. Therefore, means must be provided to temperature compensate the photocells over a wide operating range, or the system will be prone to false triggering by the photocells. To this end, the flame photocell 60 is automatically compensated by the shunting bias resistor 137, since the 56 kilohm impedance of the resistor 137 is much lower than the dark cell impedance of the flame photocell. Hence, in the absence of flame detection, the combined impedance of the resistance 137 in parallel with the photocell 60 is essentially that of the resistance 137 alone. On the other hand, when light from a flame impinges upon the photocell 60, the impedance of the photocell drops to a point where it is no longer masked by the resistance 137.

The smoke photocell 30 is temperature compensated by the differential amplifier arrangement, and the ballast photocell 102 which controls the input to the base of the transistor 128. The ballast photocell 102 may be of the Clairex AL 603 type, having the same characteristics as the smoke photocell 30 execpt for the orientation of the photosensitive surface. Therefore, the impedance vs. temperature curve for the ballast photocell 102 essentially duplicates that for the smoke photocell 30.

The ballast photocell 102 is connected in series with a resistor 143, of 150 kilohms, between the buses 124, 125, the junction 145 between the resistor and photocell being connected directly to the base of the transistor 128. Hence, the ballast photocell 102 and resistor 143 provide an input voltage dividing network for the transistor 128 in the same manner as the photocells 30 and 60 do for the transistor 127.

The grain of wheat lamps 36 and 104 are also connected in series, through a dropping resistor 147, of 150 ohms, across the regulated D.-C. line. A variable shunt resistance 149, of 0–100 ohms, may be included with the lamp 104 to insure that the quiescent operating point of the ballast photocell 102, due to light from the lamp 104, is the same as the quiescent point of the smoke photocell 30 due to light from the lamp 36.

In the absense of smoke detection, impedance variations in the smoke photocell 30 will be exactly the same as those in the ballast photocell 102. Under these circumstances, both inputs to the differential amplifier will be identical and, therefore, the differential output of the amplifier will be zero. However, when the impedance of the photocell 30 varies due to attenuation of the light impinging upon the photocell, as opposed to temperature induced impedance changes, the negative voltage input to the base of the transistor 127 will exceed the input to the base of the transistor 128. This occurs because the ballast photocell 102 still receives an unattenuated beam of light from the lamp 104. Hence there is an increase in the current output from the collector of the transistor 127, and this increase in current is sufficient to trigger the warning system. Therefore, it will be apparent that the ballast photocell 102 is capable of compensating for temperature induced impedance changes in the smoke photocell 30, but does not alter the response capabilities of the system to impedance changes occurring by virtue of the presence of smoke.

The voltage output of the detection and warning device 10 appears across the output terminals 151, 152. This output is in series with a semiconductor switching device 154, such as a silicone control rectifier of the 2N1595 type. The control rectifier 154 has a trigger electrode 155, and the rectifier draws very low load current while it is in the "off" condition. However, the application of a relatively low energy drive signal to the trigger electrode 155 is sufficient to "fire" the control rectifier 154 to a conductive "on" condition.

The output indicating or warning circuitry 157 is connected across the output terminals 151, 152 and is in series with the control rectifier 154. The output indicating circuitry may take the form of a multivibrator or relay feeding a lamp or buzzer, etc., over telephone or monitoring console lines. Moreover, portions of this output indicating circuitry may be embodied directly within the device 10 if desired.

When the control rectifier 154 is in the "off" condition, the voltage appearing at the output terminals 151, 152 is insufficient to activate the multivibrator or relay circuitry and, hence, no warning signal is generated. This is particularly important in the case of telephone lines, where it would be undesirable to generate any type of electrical disturbance except in the case of actual fire-indicative conditions. Otherwise, the device would interfere with normal telephone service and could not be used except with separate, signal carrying lines.

When the control rectifier 154 is in the "on" condition, it essentially shunts the output indicating circuitry 157 directly across the D.-C. line between the buses 124, 125, so that the output indicating circuitry receives the full 9 volts of regulated D.-C. This D.-C. line voltage is sufficient to activate the output indicating circuitry for generation of an appropriate warning signal.

The output of the transistor amplifier is directly coupled to the trigger 155 of the control rectifier 154 by connecting the collector of the transistor 127 to the trigger. The critical temperature level detector 66 and the rate of rise of temperature detector 80 are also connected to the trigger electrode 155, so that the closing of the contacts of either of these detectors will shunt the trigger electrode to ground, whereby the trigger current level will be sufficient to turn on the control rectifier 154. Should flame or smoke alter the impedances of either of the photocells 30, 60, the output current of the collector from the transistor 127 would also raise the trigger current level sufficiently to condition the control rectifier to its "on" state.

A thermistor 157, of 1 kilohm, connected in series with a resistor 159, of 270 ohms, is used to shunt the trigger electrode 155 to the output terminal 152, in the conventional manner used for temperature stabilizing the characteristics of semiconductor control rectifiers.

It will be apparent from the foregoing description that the control rectifier 154 behaves as a switch which must be conditioned to the "on" state, in order to energize the output indicating circuitry 157. Therefore, the electrical circuitry of FIGURE 8 couples the various sensing units to the control rectifier 154 in a manner whereby activation of any one or more of the sensing units triggers the control rectifier to such an "on" state. Moreover, the circuitry of FIGURE 8 also provides temperature stability for the smoke and flame photocells 30, 60, respectively, and thereby minimizes the possibility of erratic and false response on the part of these sensing units.

It will also be noted that the entire detection and warning device 10, including the circuitry of FIGURE 8 and all of the various sensing units, is provided in a single, compact and rugged package suitable for use over a wide range of operating conditions. Moreover, the novel flue arrangement embodied within the device 10 considerably enhances the rapidity and reliability of response from the smoke sensing unit.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:
1. A smoke detector, comprising:
   a chassis having at least one component mounting surface and a second surface;
   a pair of spaced apart, opaque housings mounted upon said mounting surface of said chassis, each of said housings having outer walls;
   a lamp carried within one of said housings;
   a photoelectric device carried within the other of said housings, said photoelectric device having a photosensitive surface;
   a pair of coaxially aligned holes defined by said walls at confronting sides of said housings, whereby light from said lamp will be directed along an optical axis to impinge upon said photosensitive surface;
   a first opening defined in said mounting surface of said chassis, said first opening being located between said housings;
   a second opening defined in said second surface of said chassis and communicating with air outside the smoke detector;
   a cover surrounding said housings and mounted upon said mounting surface of said chassis, a portion of the interior surface of said cover being a tapered surface tapering towards said first opening in said mounting surface of said chassis, the taper angle of said tapering surface with respect to said mounting surface of said chassis being approximately the same as the angle formed with said mounting surface by a line drawn from the center of said first opening through the center of said optical axis;

and a flue passageway extending between said first and said second openings, the cross-sectional area of said passageway progressively decreasing in moving along said passageway from said first opening to said second opening.

2. A smoke detector as set forth in claim 1, wherein the ends of said housings opposite those mounted upon said mounting surface of said chassis are scooped to provide tapered surfaces such that the vertex of the angle formed between said tapered surfaces lies approximately at the center of said optical axis.

References Cited by the Examiner

UNITED STATES PATENTS

| | | | |
|---|---|---|---|
| 1,256,740 | 2/1918 | Steiger | 340—237 |
| 1,487,898 | 3/1924 | Stolp. | |
| 2,537,028 | 1/1951 | Cahusac et al. | 340—237 X |
| 2,699,538 | 1/1955 | Nickel | 340—237 |
| 3,135,950 | 6/1964 | Finkle | 340—237 |
| 3,153,226 | 10/1964 | Jensen | 340—237 |
| 3,222,662 | 12/1965 | Giuffrida | 340—237 |

NEIL C. READ, *Primary Examiner.*

D. K. MYER, *Assistant Examiner.*